United States Patent
Gagnon et al.

[11] Patent Number: 5,983,071
[45] Date of Patent: Nov. 9, 1999

[54] VIDEO RECEIVER WITH AUTOMATIC SATELLITE ANTENNA ORIENTATION

[75] Inventors: Gregory J. Gagnon, Torrance; Jeffrey W. Crosby, Sherman Oaks, both of Calif.

[73] Assignee: Hughes Electronics Corporation, El Segundo, Calif.

[21] Appl. No.: 08/898,226

[22] Filed: Jul. 22, 1997

[51] Int. Cl.[6] .............................. H04H 1/00; H04N 7/10; H01Q 3/08

[52] U.S. Cl. ........................... 455/3.2; 342/359; 348/10; 455/6.2

[58] Field of Search .............................. 455/3.1, 3.2, 4.1, 455/4.2, 5.1, 6.1, 6.2, 6.3; 348/6, 7, 8, 10, 12, 13; 342/73–76, 350, 359

[56] References Cited

U.S. PATENT DOCUMENTS

| | | |
|---|---|---|
| 4,860,352 | 8/1989 | Laurance et al. . |
| 4,993,067 | 2/1991 | Leopold . |
| 5,173,708 | 12/1992 | Suzuki et al. . |
| 5,243,652 | 9/1993 | Teare et al. . |
| 5,420,592 | 5/1995 | Johnson . |
| 5,428,546 | 6/1995 | Shah et al. . |
| 5,432,542 | 7/1995 | Thibadeau et al. . |
| 5,446,465 | 8/1995 | Diefes et al. . |
| 5,455,592 | 10/1995 | Huddle . |
| 5,519,405 | 5/1996 | Matsubara et al. . |
| 5,537,102 | 7/1996 | Pinnow . |
| 5,583,514 | 12/1996 | Fulop ........................................ 342/359 |
| 5,621,793 | 4/1997 | Bednarek et al. . |
| 5,719,918 | 2/1998 | Serbetciouglu et al. . |
| 5,760,819 | 6/1998 | Sklar et al. ............................... 455/6.3 |
| 5,790,074 | 8/1998 | Rangedahl et al. . |
| 5,790,175 | 8/1998 | Sklar et al. ............................... 455/6.3 |
| 5,801,751 | 9/1998 | Sklar et al. ............................... 455/6.3 |

*Primary Examiner*—John W. Miller
*Attorney, Agent, or Firm*—John A. Crook; Michael W. Sales

[57] ABSTRACT

A video apparatus for receiving broadcast direct-to-home audiovisual program data is provided with a position generator disposed at a position which generates a position signal corresponding to the position, an antenna for receiving broadcast audiovisual program data, the antenna being positionable in a plurality of different orientations including an initial orientation, a decoder coupled to the antenna for decoding the program data and being adapted to be connected to e.g. a home video display for display of programming corresponding to the program data, and an adjustment mechanism coupled to the antenna for automatically adjusting the initial orientation of the antenna based upon the position signal generated by the position generator. The antenna may be, for example, a satellite dish that is adapted to receive broadcast carriers from a broadcasting satellite. The adjustment mechanism may automatically orient the antenna based upon the relative qualities (e.g. magnitudes and/or error rates) of at least one broadcast signal received by the antenna when the antenna is in a first orientation and when the antenna is in a second orientation.

15 Claims, 6 Drawing Sheets

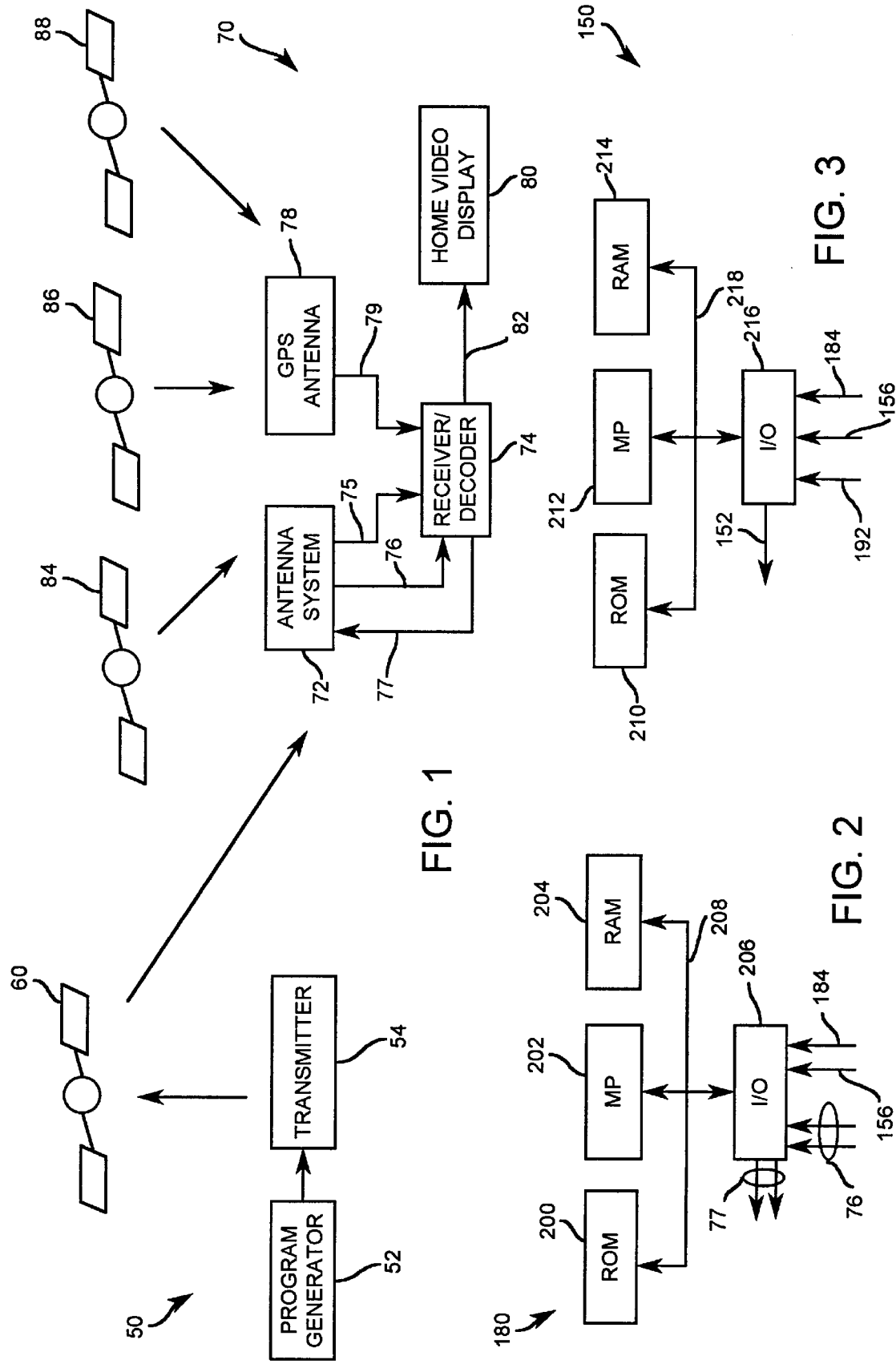

---

VIDEO RECEIVER WITH AUTOMATIC SATELLITE ANTENNA ORIENTATION

BACKGROUND OF THE INVENTION

The present invention relates to a video receiver used to receive audiovisual programs and data broadcast from a satellite, for example, and which is adapted to be connected to a home video display, such as a television, or other video, audio, and/or data output device.

Direct broadcast satellite systems (DBS) for broadcasting video, audio, data and other programming (herein sometimes referred to as program data) to a plurality of remote locations have been available to consumers for more than one year prior to the filing of this patent. An example is the DSS® system utilized by DIRECTV and USSB broadcasting services. Typical DBS systems generate satellite broadcasts which are received by relatively small satellite antennas (such as dishes) each of which is typically owned by an individual subscriber, disposed at locations such as a house or hotel, for example. The satellite antenna system is utilized in conjunction with a prior art receiver unit, which also includes a decoder adapted to be connected to a video or other output device (e.g. audio system or computer) and which provides decoded program data outputs to the output device.

In such known consumer systems, the satellite antenna of the receiver is initially oriented towards the geosynchronous satellite from which it is to receive broadcast program in a manual manner by the subscriber as described below. The subscriber determines the correct azimuth and altitude for their geographic location. This may be done by utilizing zip codes or latitude and longitude information. In known systems, the needed azimuth and altitude information may be obtained by entering the geographic information (e.g. zip code, or latitude and longitude). The receiver unit then accesses a lookup table stored in its internal memory to determine the azimuth and elevation angles to which the antenna should be oriented so that it points to the satellite, and displays those angles e.g. on the television to which the receiver unit is connected.

The subscriber then manually orients the satellite antenna to the azimuth angle specified by the receiver unit by using a compass, and to the elevation angle specified by the receiver unit by using a set of elevation angle markings, similar to the markings on a protractor, disposed on the satellite antenna support.

After the satellite antenna is initially oriented in the above manner, the subscriber may adjust its orientation by using a display, typically generated by the receiver unit for display on e.g. the television, related to the quality (e.g. signal strength and/or error rate, or other known quality measure or factor) of the broadcast program data received by the antenna. The subscriber accomplishes the adjustment by manually moving the satellite antenna in increments until the received quality of the received broadcast is maximized. Other systems provide alternative quality factor indicators (e.g. meters or variable flashing LEDs), but still require manual incremental adjustments.

It is presently known that receiver units of DBS systems of the type described above have been previously used on an airplane in combination with a steerable parabolic antenna for receiving the broadcast signal. To enable reception of the broadcast signal regardless of the location and attitude of the airplane, the orientation of the parabolic antenna is continuously varied based upon electronic signals generated by the airplane, such as signals representing latitude, longitude and altitude.

It is also known that receiver units of DBS systems have been previously used on a ship in combination with a steerable parabolic antenna for receiving the broadcast. To enable reception of the broadcast regardless of the location and attitude of the ship, the orientation of the parabolic antenna is continuously varied based upon e.g. the sensed signal strength of the broadcast signal and/or attitude of the ship.

SUMMARY OF THE INVENTION

The present invention is directed to a consumer video apparatus for receiving broadcast program data. The video apparatus includes a position generator which generates a position signal corresponding to the geographic position of the device, an antenna for receiving broadcast program data, the antenna being positionable in a plurality of different orientations including an initial orientation, a decoder coupled to the antenna for decoding the program data and being adapted to be connected to a home video display for display or other processing of outputs corresponding to the program data, and an adjustment mechanism coupled to the antenna for automatically adjusting the initial orientation of the antenna based upon the position signal generated by the position generator.

The antenna may be, for example, a satellite dish that is adapted to receive the program data from a broadcasting satellite. The adjustment mechanism may include a first actuator for moving the antenna in a first direction and a second actuator for moving the antenna in a second direction different from the first direction. The adjustment mechanism may also include means for automatically orienting the antenna based upon the relative qualities (e.g. signal strength, and/or error rate, and/or other known quality factors for such signals or data) of at least one broadcast signal received by the antenna when the antenna is in a first orientation, and when the antenna is in a second orientation.

The video apparatus may be used as part of a video broadcasting system having means for broadcasting audio-visual program data to a plurality of locations remote from the broadcasting site. The broadcasting means may have a program generator for generating the program data, a transmitter coupled to receive the program data from the program generator, and a satellite coupled to receive a program data carrier from the transmitter and rebroadcast the program data carrier on an offset frequency to the plurality of remote locations. The position generator used in the video apparatus may generate the position signal based upon signals received from at least three other satellites.

The invention is also directed to a method of receiving broadcast program data by a receiver unit disposed at a position and being adapted to be connected to a home output device, such as a video display. The method includes the steps of generating a position signal corresponding to the geographic position of an antenna, automatically changing the initial orientation of the antenna to a subsequent orientation based upon the position signal, receiving the broadcast program data with the antenna, and causing the home output device to display or otherwise process outputs corresponding to the program data.

The method may also include the further steps of determining the quality of at least one broadcast data signal (e.g. the carrier, or the encoded data, or both) received by the antenna when the antenna is in a first orientation, automatically changing the first orientation of the antenna to a second orientation, determining the quality of the broadcast data signal received by the antenna when the antenna is in the second orientation, electronically comparing the quality of the broadcast signal when the antenna is in the first and second orientations, and automatically changing the second orientation of the antenna based on whether the quality of the broadcast signal in the second orientation was greater than or less than the quality of the broadcast signal in the first orientation.

The features and advantages of the present invention will be apparent to those of ordinary skill in the art in view of the detailed description of the preferred embodiment, which is also made with reference to the drawings, a brief description of which is provided below.

BRIEF DESCRIPTION OF THE DRAWINGS

FIG. 1 is a block diagram of a preferred embodiment of an audiovisual broadcasting system in accordance with the invention;

FIG. 2 is a block diagram of an antenna controller shown schematically in FIG. 5;

FIG. 3 is a block diagram of an access controller shown schematically in FIG. 5;

DETAILED DESCRIPTION OF THE PREFERRED EMBODIMENT

Figure 4:
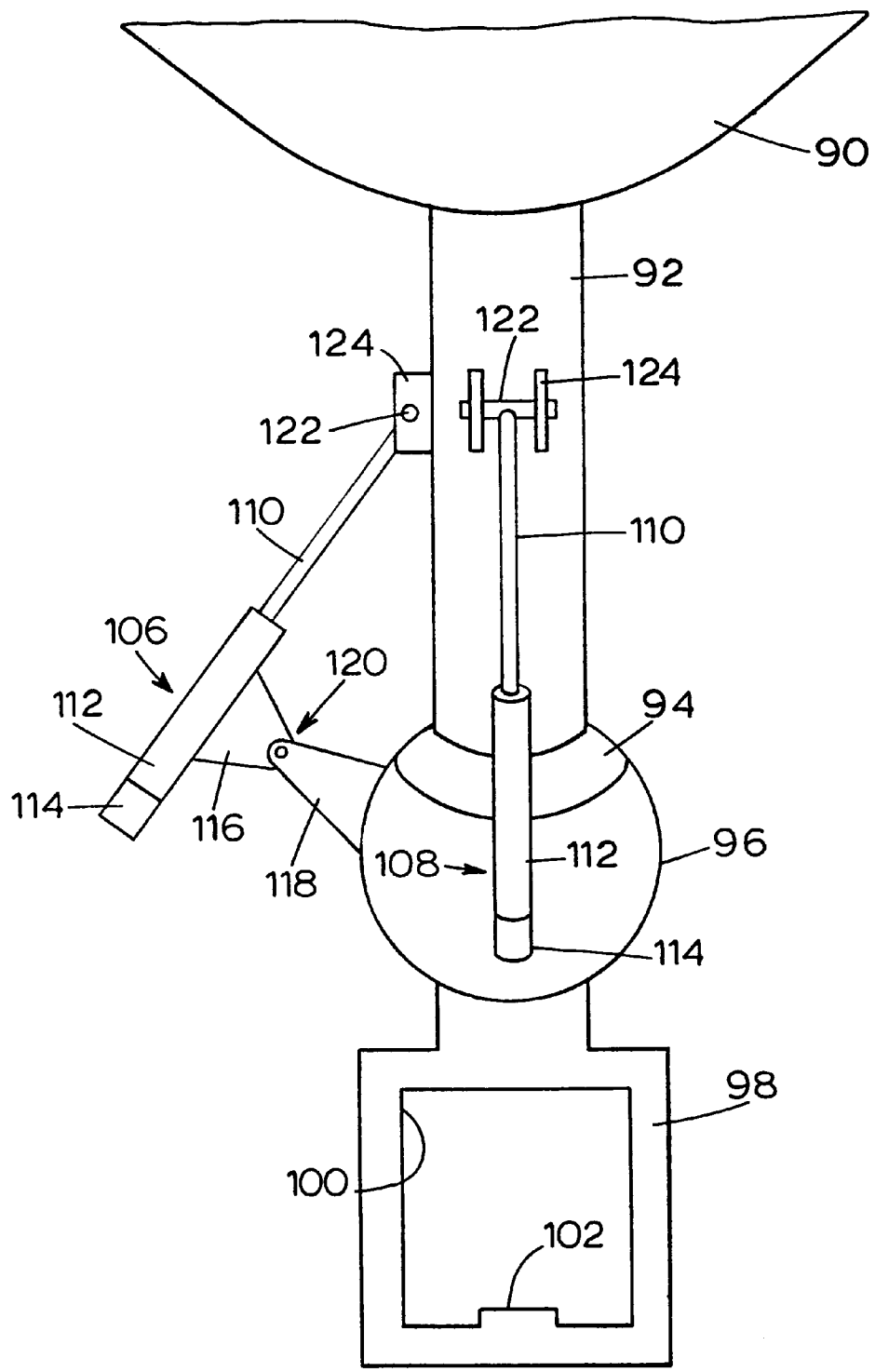
FIG. 4 is an illustration of a satellite antenna and an adjustment mechanism for adjusting the orientation of the antenna.

FIG. 1 illustrates an audiovisual broadcasting system in accordance with the invention. Referring to FIG. 1, the broadcast system includes a central broadcasting station 50 having a program generator 52 connected to provide audiovisual and other program data to a transmitter 54. The program generator 52 may comprise multiple digital video disks (DVD) or video servers which store compressed video data representing a plurality of pre-recorded video programs or movies, other recorded program sources (e.g. digital video tape), and/or sources of live or "turn-around" programming. The central broadcasting station 50 has a network controller 56 that may be used to insert network commands into the program data generated by the program generator 52. The program and other data are preferably transmitted in packets, using both frequency and time domain multiplexing. Other schemes (e.g. other packaging or transmission of digital or analog information) may also be used. The program data is processed in known manners to generate a plurality of RF uplinks comprising program data carriers.

The transmitter 54 transmits the program data carriers from the central broadcasting station 50 to one or more satellites 60. Downlink program data carriers, generally on offset frequencies, are then broadcast by the satellite 60 to a plurality of receiver units 70 disposed at various geographic locations remote from the central broadcasting station 50.

One of the receiver units 70 is shown in FIG. 1 to have an antenna system 72, such as a satellite dish, for receiving the program data carriers broadcast by the satellite 60, a receiver/decoder 74 connected to the antenna system 72 via a data line 75, and a global-positioning system (GPS) antenna 78 connected to the receiver/decoder 74 via a data line 79. It should be understood that in certain embodiments a greater or lesser number of connecting lines may be used, and various of the data may be multiplexed onto one or more shared lines. Wireless data links may also be used. The receiver/decoder 74 is connected to provide decoded program signals to a home video display 80, such as a television or other output device, via a line 82. Wireless links may also be used.

The GPS antenna 78 may be a conventional antenna that receives signals from at least three satellites 84, 86, 88 and, in combination with a GPS receiver described below, generates therefrom a position signal representing the precise geographic position of the antenna system 72, and thus of the receiver unit 70. As described in U.S. Pat. No. 5,446,465, the disclosure of which is incorporated herein by reference, the global positioning system can be used to determine geographic position within 100 meters or less for non-military applications.

The receiver unit 70 may be disposed at a fixed position. The GPS antenna 78 is typically positioned outside the subscriber's dwelling and the receiver/decoder 74 is typically positioned inside the dwelling. In most cases, the GPS antenna 78 is positioned within ten meters or so of the receiver/decoder 74. As used herein, the term "fixed" position means a stationary position that remains fixed and is not moved for relatively long periods of time, such as months or years. Alternatively, the receiver unit 70 may be a mobile unit, such as disposed in a mobile home.

FIG. 4 illustrates one possible embodiment of a portion of the antenna system 72 in the form of a satellite dish 90 (only a portion of which is shown) that is adjustable between a number of different orientations. The satellite dish 90 has a central support shaft 92 which is integrally formed with or otherwise connected to a ball member 94 which is rotatably contained within an aperture formed in a spherical socket 96. The socket 96 is integrally formed with or otherwise connected to a bracket 98 having a generally square internal aperture 100 to accommodate mounting the satellite dish 90 on a mounting post (not shown) having a square cross-sectional area. Other articulated mounts may also be utilized.

The bracket 98 may be provided with an internal key 102 that is disposed within a slot in the mounting post (to facilitate proper orientation of the dish 90 on the mounting post), and the bracket 98 may be held in place on the mounting post with one or more screws (not shown). The particular manner in which the satellite dish 90 is supported is not considered important to the invention, and other ways of mounting the satellite dish 90 could be used, with or without the use of a mounting bracket and/or mounting post.

The orientation of the satellite dish 90 may be adjusted via an adjustment mechanism having a first actuator 106 for moving the satellite dish 90 in a first direction, and a second actuator 108 for moving the dish 90 in a second direction generally perpendicular to the first direction, the actuators 106, 108 being connected to the support shaft 92 at two locations spaced preferably 90 degrees apart. Each actuator 106, 108 has a rod 110 which is linearly is translatable into and out of a cylinder 112 under the control of a motor 114, such as a stepping motor. The translation of the rods 110 may be accomplished via a screw or ball jack drive or any other conventional mechanism which translates rotation of the motors 114 into linear travel of the rods 110.

Each of the cylinders 112 is mounted to the socket 96 via a mounting arm 116 fixed to the cylinder 112 and a support arm 118 fixed to the socket 96 and pivotally connected to the mounting arm 116 at a pivot point 120. The end of each rod 110 has a transverse rod 122 welded or otherwise connected to it. Each transverse rod 122 is rotatably journalled within a pair of holes formed in a pair of brackets 124 connected to the support shaft 92.

Figure 5:
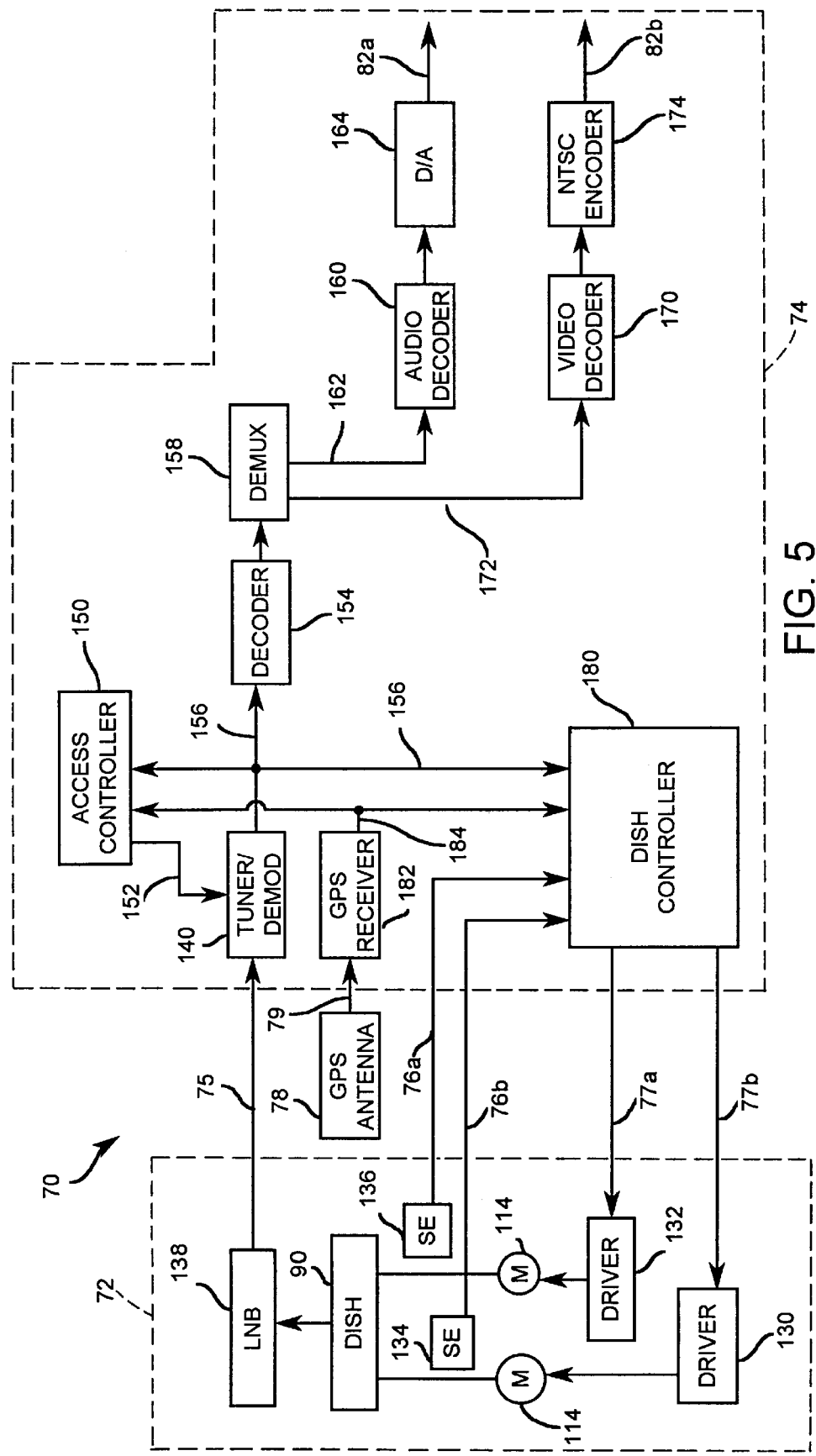
FIG. 5 is a block diagram of a receiver unit shown schematically in FIG. 1.

FIG. 5 is a block diagram of the receiver unit 70 shown generally in FIG. 1. Referring to FIG. 5, the motors 114 which are used to position the satellite dish 90 of the antenna system 72 are driven by a pair of driver circuits 130, 132, and the motors 114 have a pair of shaft encoders 134, 136 associated therewith. The shaft encoders 134,136 generate signals representing the degree of rotation of the shafts of the motors 114. Other open- or closed-loop systems may also be employed.

The program data carriers received by the satellite antenna 90 are provided to a low-noise block (LNB) circuit 138 which performs conventional block frequency shift functions. The LNB may also select a subset of the received carriers (e.g. a single polarization) for output to the IRD. The resulting data are provided to a tuner/demodulator 140 of the receiver/decoder 74 via the line 75. The tuner/demodulator 140, which is activated by an authorization signal generated by an access controller 150 and transmitted to the tuner/demodulator 140 via a line 152, tunes the frequency band of the desired program data, demodulates the received IF signal from the LNB to generate e.g. a stream of digital data packets, and selects those packets corresponding to the desired program.

The digital data packets (in the preferred embodiment) are provided from the tuner/demodulator 140 to a decoder 154 via a line 156. The decoder 154 reformulates the data packets, removing portions of the data packets that do not represent actual programming, to generate a stream of digital data representing the audio and video portions of a program. That data stream is provided to a demultiplexer 158 which separates the audio and video portions of the digital data stream.

The audio portions of the data stream are provided to an audio decoder 160 via a line 162. The audio decoder 160, which may be a conventional MPEG (Motion Pictures Experts Group) audio decoder is connected to a digitalto-analog (D/A) converter 164, which converts the digital signal to an analog signal which is provided to the output device via a line 82a. Other decoders appropriate to other output devices (e.g. digital audio) may similarly be employed.

The video portions of the data stream generated by the demultiplexer 158 are transmitted to a video decoder 170 via a line 172. The video decoder 160, which may be a conventional MPEG decoder, decodes the data in a conventional manner and then transmits the decoded signal to a conventional NTSC encoder 174, which converts the digital signal to an analog NTSC video signal which is provided to the output device, e.g. analog home video display 80 (FIG. 1) via a line 82b. Again, other decoders appropriate to other output devices (e.g. digital video) may similarly be employed.

The particular manner in which the program data are processed and decoded is not considered important to certain aspects of the invention, and other manners of processing the program data after they are received from the antenna system 72 may be used to convert the program data into a form usable with an analog or digital home video display.

The data output from the tuner/demodulator 140 on the line 156 are also provided to the access controller 150 and to an antenna controller 180 that is used to automatically adjust the orientation of the satellite dish 90. The GPS antenna 78 periodically generates signals, based on communication signals preferably received from at least three GPS system satellites 84, 86, 88 (FIG. 1), which can be used to determine the particular geographic position of the GPS antenna 78, and thus of the receiver unit 70. The signals generated by the GPS antenna 78 are transmitted to a position generator in the form of a GPS receiver 182, which generates a position signal based on the GPS signals received from the GPS antenna 78 and transmits the position signal to the access controller 150 and the dish controller 180 via a line 184.

FIG. 2 is a block diagram of the hardware components of the antenna controller 180 shown schematically in FIG. 5. The controller 180 may be a conventional controller (either a single-chip controller or a multiple-chip controller such as a personal computer) having a computer program memory in the form of a read-only memory (ROM) 200, a microprocessor (MP) 202, a random-access memory (RAM) 204, an input/output (I/O) circuit 206, all of which are interconnected via an address/data bus 208.

FIG. 3 is a block diagram of the hardware components of the access controller 150 shown schematically in FIG. 5. The controller 150 may be a conventional controller having a computer program memory in the form of a ROM 210, a microprocessor 212, a RAM 214, an I/O circuit 216, all of which are interconnected via an address/data bus 218.

Figure 6:
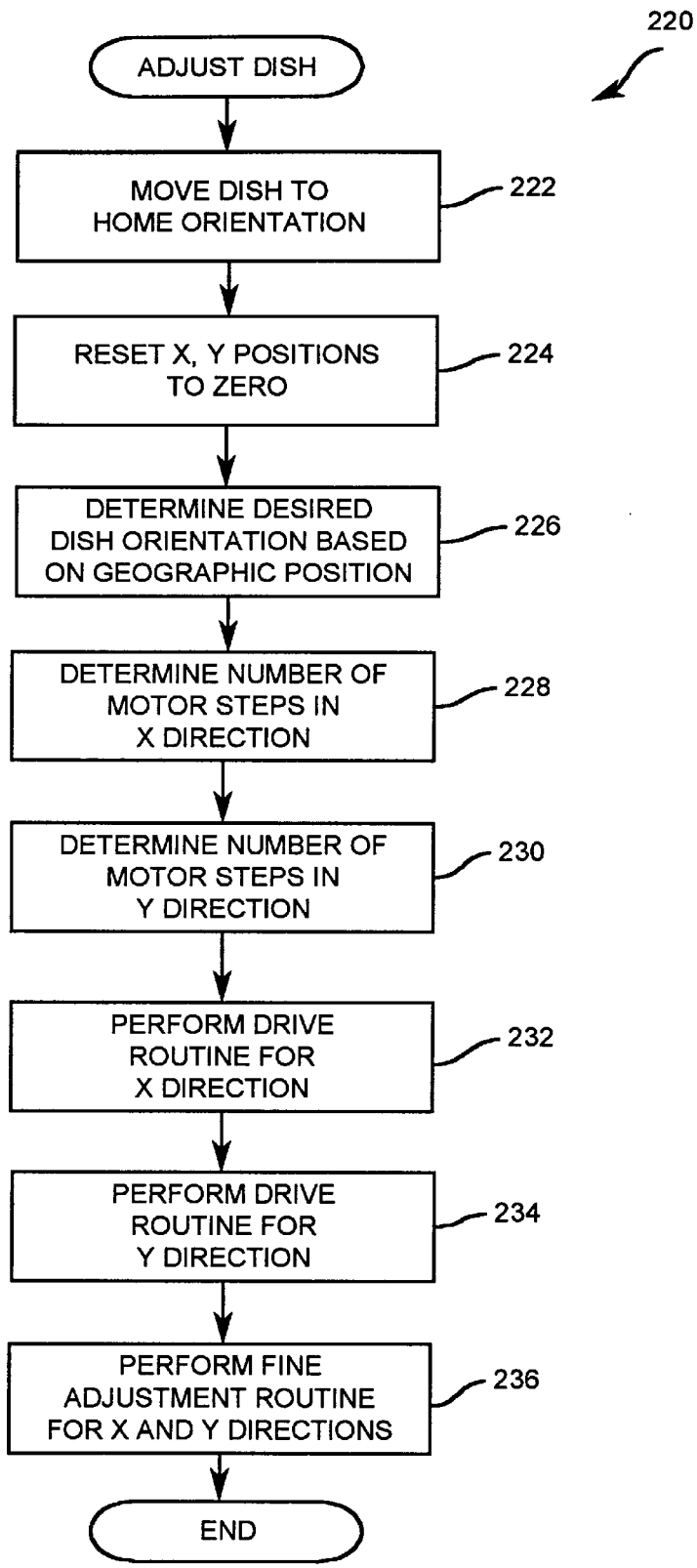
FIG. 6 is a flowchart of a software routine for adjusting the orientation of the satellite antenna shown in FIG. 4.

FIG. 6 is a flowchart of a computer program routine 220 performed by the dish controller 180 that may be used in certain embodiments to automatically adjust the orientation of the satellite dish 90. Referring to FIG. 6, at step 222 the satellite dish 90 is moved to a reference or "home" orientation. This preferably relates to a known orientation of the antenna, such as a horizontal (or other known) elevation and a south (180 degrees) or other known azimuth. This may be accomplished in a conventional manner by providing each of the actuators 106, 108 (FIG. 4) with a limit switch or the like (e.g. optical, mechanical, magnetic, or other detector, not shown) used as a "home sensor" that detects when the rod 110 associated with that limit switch reaches a predetermined or home position. To move the dish 90 to its home orientation, the rods 110 are continuously moved by the dish controller 180, via the driver circuits 130, 132 (FIG. 5) and motors 114 until the limit switches generate their home signals. In preferred embodiments the limit switch may be provided in the form of a magnetically activated reed switch connected at a fixed position relative to the cylinders 112, and a magnet attached to the rods 110 which activates the reed switch when disposed adjacent the reed switch.

The angular orientation of the satellite dish 90 could be measured at all times, in which case one of the rods 110 could be assigned a first or X direction (e.g. altitude) and the other rod 110 could be assigned a second, perpendicular or Y direction (e.g. azimuth). In this case, at step 224 the X and Y orientations of the rods 110 could be reset to zero since the satellite dish 90 is in the home or reference orientation.

At step 226, the desired orientation of the satellite dish 90 is determined based on the geographic position signal generated by the GPS receiver 182 and transmitted to the dish controller 180 via the line 184. The desired orientation of the dish 90 could be determined by utilizing a lookup table stored in the memory of the dish controller 180. If a lookup table is used, each position signal that could be generated by the GPS receiver 182 could be provided in a first column of the lookup table, and for each position signal, the corresponding orientation of the satellite dish 90 in the X and Y directions could be stored. Thus, by locating the particular position signal generated by the GPS receiver 182 in the lookup table, the corresponding orientation of the satellite dish 90 in the X and Y directions could be retrieved.

The desired orientation of the dish 90 in the X and Y directions stored in the lookup table for each geographic position could be empirically determined by determining the correct orientation of the dish 90 at each of a number of different geographic locations and translating each such orientation into the X and Y orientation data for storage in the lookup table. To limit the number of geographic locations at which the correct orientation needs to be measured, interpolation could be used. The stored values may take into consideration and compensate for any non-linearities in the operation of the mechanical system employed.

To limit the size of the lookup table, the position signals stored therein could be limited to certain geographic areas, such as relatively large urban areas. Alternatively, instead of storing individual position signals in the lookup table, ranges of positions signals could be stored. For example, if the position signal generated by the GPS receiver 182 has a component in degrees (or smaller increments) latitude and a component in degrees (or smaller increments) longitude, the dish controller 180 would search the lookup table for the latitude range into which the latitude component of the position signal fell and the longitude range into which the longitude component of the position signal fell, and would retrieve the satellite dish orientation data provided for the combination of those two ranges.

The particular manner of converting the position signal to the desired dish orientation is not considered important to certain aspects of the invention. Instead of providing a lookup table stored in memory, data representing the desired X and Y orientation data could be generated in accordance with equations.

At steps 228 and 230, in the embodiment illustrated the number of motor steps in the X and Y directions needed to move the satellite dish 90 to the orientation determined at step 226 are determined. For example, if the X and Y orientation data in the lookup table is stored in units of centimeters, steps 228 and 230 would be performed by multiplying the number of centimeters in each direction by the number of motor steps required to move the rods 110 a single centimeter. If the X and Y orientation data stored in the lookup table is stored in units corresponding to motor steps, no conversion is required and steps 228, 230 would be omitted.

At step 232, a drive routine described below is performed to drive the motor 114 for the X direction the number of steps determined at step 228, and at step 234, the drive routine is performed to drive the motor 114 for the Y direction the number of steps determined at step 230. After step 234, the satellite dish 90 will have been moved to an orientation, based on the geographic position signal generated by the GPS receiver 182, in which the dish 90 is pointing generally at the satellite 60 (FIG. 1) which broadcasts the program data to the receiver unit 70. To further adjust the orientation of the satellite dish 90, a fine adjustment routine, described in more detail below, may be performed at step 236 for both the X and Y directions.

Figure 7:
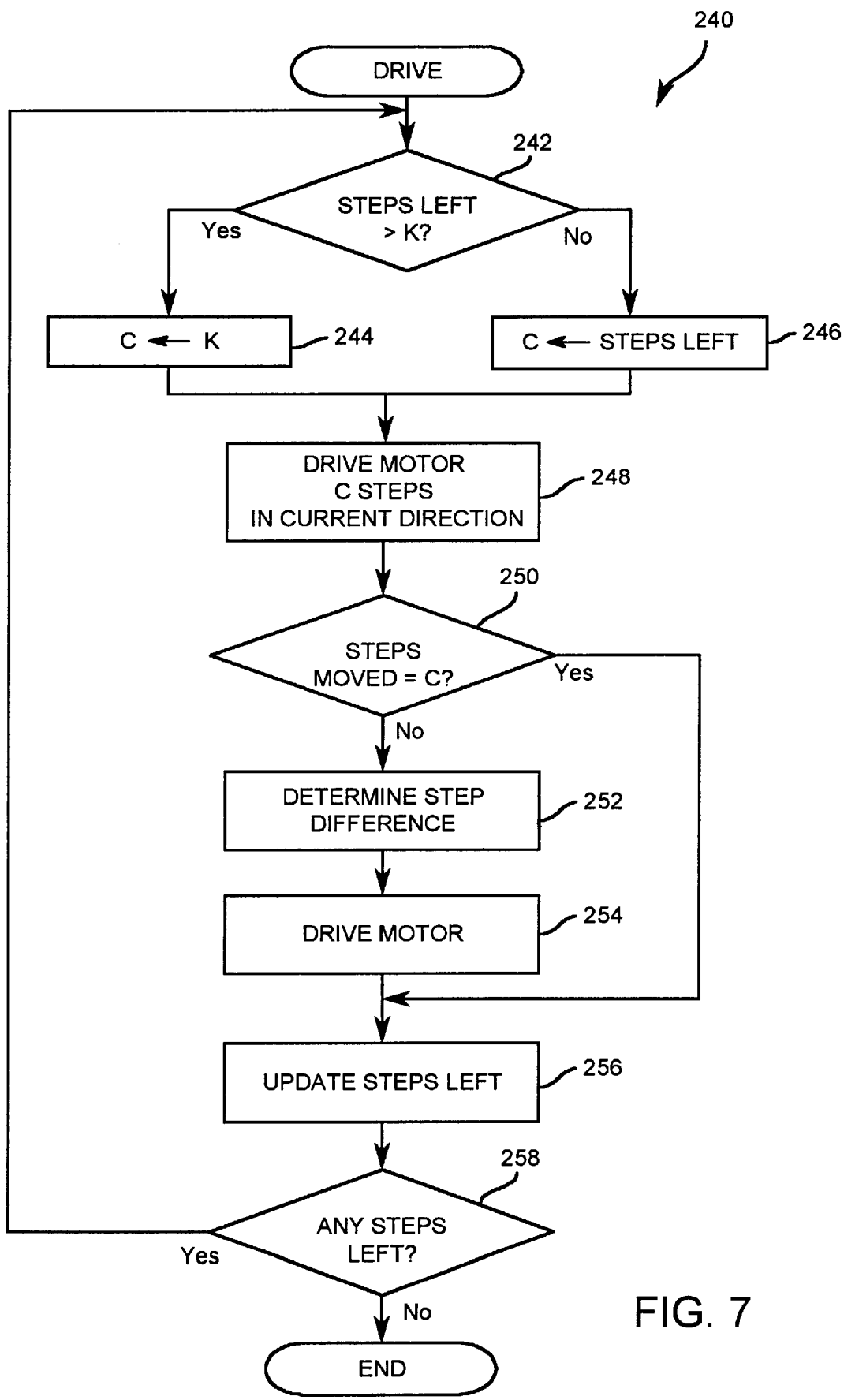
FIG. 7 is a flowchart of a software routine for driving motors used to orient the satellite antenna shown in FIG. 4.

FIG. 7 is a flowchart of a drive routine 240 performed by the dish controller 180, which was referred to above in connection with steps 232 and 234 of FIG. 6. The purpose of the drive routine 240 is to drive the motors 114 (one at a time) a particular number of steps in a particular direction, to move the rods 110 back and forth.

Referring to FIG. 7, the drive routine 240 drives the motors 114 no more than a certain number of steps at a time, that number being arbitrarily referred to as K. For example, if one of the motors 114 is to be driven a total of 240 steps and K is 25, the motor 114 would be driven 25 steps at a time until all the steps were moved. After each move of K steps, the dish controller 180 checks the shaft encoder 134 or 136 for the motor 114 being driven to make sure that the motor 114 actually moved the requested number of steps.

At step 242, if the number of steps left to be moved is greater than the predetermined number of K steps, the program branches to step 244 where the number of steps C that the motor 114 will be moved is set to K. Otherwise, the program branches to step 246 where C is set to the number of steps that are left to be moved.

At step 248, the motor 114 for the current direction (as specified by one of steps 232, 234) is moved C steps. At step 250, the number of steps actually moved by the motor 114 is checked, via the shaft encoder 134 or 136 associated with the motor 114 being driven, to make sure that the motor 114 actually moved C steps. If the motor 114 did not actually move C steps, the program branches to step 252 where the difference between the number of steps that were supposed to be moved and the number of actual steps is determined, and at step 254 the motor 114 is driven the number of steps determined in step 252.

At step 256, the number of steps left is updated by decreasing the number of steps left by the number of steps C just moved. At step 258, if there are any steps left, the program branches back to step 242, where the process described above is repeated until the motor 114 for the current direction has been moved the requested number of steps.

As previously mentioned, other open- or closed-loop techniques may be used in connection with other embodiments and aspects of the invention.

Figure 8:
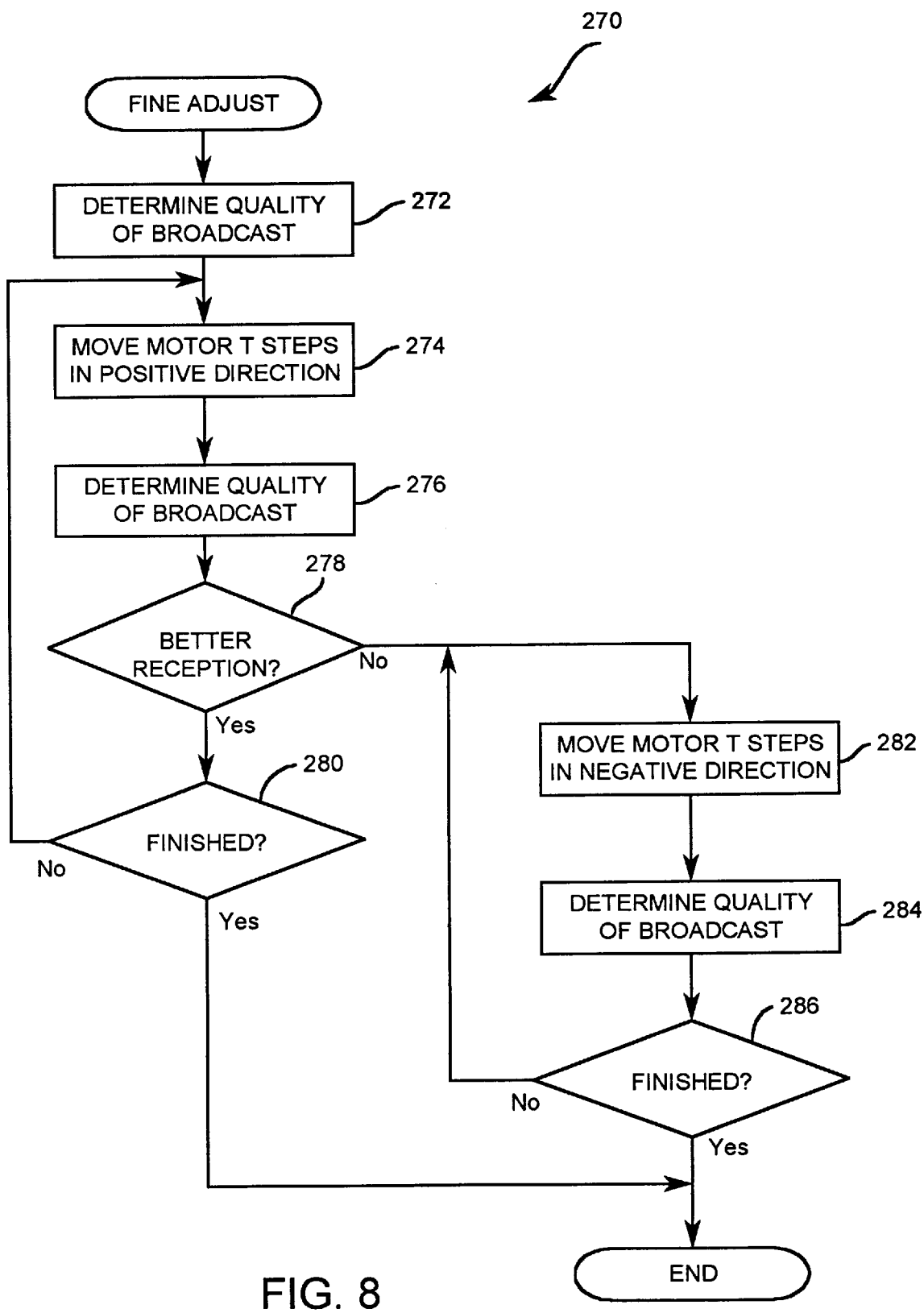
FIG. 8 is a flowchart of a software routine for finely adjusting the orientation of the satellite antenna.

FIG. 8 is a flowchart of a fine adjustment routine 270 that may be performed by the dish controller 180, which was referred to above in connection with step 236 of FIG. 6. The purpose of the fine adjustment routine 270 is to optimally adjust the orientation of the satellite dish 90, after its initial orientation based on the position signal, so that the quality (e.g. signal strength, and/or error rate, and/or other quality factor(s)) of one or more broadcast program signals (e.g. data carrier(s) and/or encoded data) from the desired satellite (s) as received by the satellite dish 90 is maximized. Each time the fine adjustment routine 270 is performed, it adjusts the orientation of the satellite dish 90 in a single direction. The fine adjustment routine 270 may be performed once for each direction, or multiple times for each direction.

Referring to FIG. 8, at step 272 the quality of the broadcast signal presented to the dish controller 180 via the line 156 is determined. In the illustrated embodiment the signal via line 156 permits controller 180 to react to the quality of e.g. the tuned and demodulated signal. Where other quality factor(s) are used, other inputs may be alternatively or additionally provided to controller 180, such as inputs directly from the LNB, from the decoder, etc. Error rates may be input from any portion of the IRD generating such data, e.g. from the IRD controller (not illustrated). All such embodiments are intended to be within the scope of the invention herein.

At step 274, the motor 114 for the current direction (e.g. X or Y) is moved an arbitrary number of steps T in the positive direction (e.g. +X direction). At step 276, the quality of the broadcast signal is again determined to see if the new orientation of the satellite dish 90 resulted in better reception of the broadcast signal, which would occur in the case where the new quality of the broadcast signal determined at step 276 is greater than the old quality of the broadcast signal determined at step 272.

At step 278, if the new orientation resulted in better reception, the program branches to step 280 where the dish controller 180 determines whether the fine adjustment of the satellite dish 90 is finished. That would be the case where, for example, the new quality of the broadcast signal is greater than the old quality by a inconsequential amount. This could be determined at step 280 by comparing the difference between the new and old qualities with a predetermined threshold value. If fine adjustment of the dish 90 is not finished, the program branches back to step 274.

At step 278, if the initial movement of the satellite dish 90 did not result in better reception, meaning that the dish 90 was moved in the wrong direction, the program branches to step 282 where the motor 114 is moved T steps in the opposite or negative direction. At step 284, the quality of the broadcast signal is then determined, and the steps 282 and 284 are repeated until the increase in quality of the broadcast signal is inconsequential, as determined at step 286 and described above in connection with step 280.

In certain embodiments, more than one quality factor may be monitored, alternatively or in combination. In certain embodiments the quality factor of more than one signal may be monitored, e.g. the strength of plural carriers, the error rates of plural channels, etc. Although in preferred embodiments the quality factor(s) of the same signal(s) are monitored at the varying antenna locations to minimize the effect of differences between signals, in other embodiments different signals may be monitored in different orientations.

These and other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A consumer direct-to-home receiving system for receiving and processing broadcast program data at a location remote from a transmitting uplink station, said system comprising:

a position generator, said position generator generating a position signal corresponding to a geographic location of the receiving system;

an antenna for receiving broadcast program data from at least one satellite, said antenna being positionable in a plurality of different orientations including an initial orientation;

a decoder coupled to said antenna for decoding said program data; and an adjustment mechanism coupled to said antenna for automatically adjusting one of said orientations of said antenna based upon said position signal generated by said position generator.

2. A system as defined in claim 1 wherein said position generator comprises means for generating said position signal based upon signals received from at least three satellites.

3. A system as defined in claim 1 wherein said adjustment mechanism comprises:

a first actuator for moving said antenna in a first direction; and a second actuator for moving said antenna in a second direction different from said first direction.

4. A system as defined in claim 1 wherein said position generator is disposed at a fixed position and generates a position signal corresponding to said fixed position.

5. A consumer direct-to-home receiving system for receiving and processing broadcast program data at a location remote from a transmitting uplink station, said system comprising:

a position generator, said position generator generating a position signal corresponding to the geographic location of the receiving system;

an antenna for receiving broadcast program data from at least one satellite, said antenna being positionable in a plurality of different orientations including an initial orientation;

a decoder coupled to said antenna for decoding said program signals; and an adjustment mechanism coupled to said antenna for automatically adjusting one of said orientations of said antenna based upon said position signal generated by said position generator, wherein said adjustment mechanism further comprises a controller, said controller controlling at least one of a plurality of actuators for moving said antenna to automatically orient said antenna in a first direction based upon the relative quality of one or more broadcast signals received by said antenna when said antenna is in a first orientation, and when said antenna is in a second orientation.

6. A system as defined in claim 5 where the relative quality of said one or more broadcast signals comprises magnitude.

7. A system as defined in claim 5 where the relative quality of said one or more broadcast signals comprises error rate.

8. A system as defined in claim 5 wherein said controller further controls a second of said actuators to automatically orient said antenna in a first direction based upon the relative quality of said broadcast signals received by said antenna when said antenna is in a third orientation, and when said antenna is in a fourth orientation.

9. A method of receiving direct-to-home satellite broadcast program data by a receiver unit disposed at a position and being adapted to be connected to a home video display, said receiver unit having an antenna with an orientation, said method comprising the steps of:

(a) generating a geographic position signal corresponding to said position of said receiver unit based upon signals received from at least three satellites;

(b) automatically changing said orientation of said antenna to a subsequent orientation based upon said position signal generated during said step (a) to cause said antenna to be oriented for receiving said broadcast program data from at least one satellite.

10. A method as defined in claim 9 wherein said receiver unit is disposed at a fixed position and wherein said step (a) comprises the step of generating a geographic position signal corresponding to said fixed position.

11. A method of receiving direct-to-home satellite broadcast program data by a receiver unit disposed at a position and being adapted to be connected to a home video display, said receiver unit having an antenna with an orientation, said method comprising the steps of:

(a) generating a geographic position signal corresponding to said position of said receiver unit based upon signals received from at least three satellites;

(b) automatically changing said orientation of said antenna to a subsequent orientation based upon said position signal generated during said step (a) to cause said antenna to be oriented for receiving said broadcast program data from at least one satellite;

(c) determining a first quality of at least one broadcast signal received by said antenna when said antenna is in a first orientation;

(d) automatically changing said first orientation of said antenna in a first direction to a second orientation;

(e) determining a second quality of at least one broadcast signal received by said antenna when said antenna is in said second orientation;

(f) electronically comparing said first and second qualities; and (g) automatically changing said second orientation of said antenna if said second quality is greater than said first quality.

12. A method as defined in claim 11 additionally comprising the steps of:

(h) determining a third quality of at least one broadcast signal received by said antenna when said antenna is in said third orientation;

(i) automatically changing said third orientation to a fourth orientation in a second direction which is not parallel to said first direction;

(j) determining a fourth quality of at least one broadcast signal received by said antenna in said fourth orientation;

(k) electronically comparing said third and fourth qualities; and (l) automatically changing said fourth orientation based on whether said fourth quality is greater than or less than said third quality.

13. A method as defined in claim 11 wherein said first and second directions are substantially parallel.

14. A method of receiving direct-to-home satellite broadcast program data by a receiver unit disposed at a position and being adapted to be connected to a home video display, said receiver unit having an antenna with an orientation, said method comprising the steps of:

(a) generating a geographic position signal corresponding to said position of said receiver unit based upon signals received from at least three satellites;

(b) automatically changing said orientation of said antenna to a subsequent orientation based upon said position signal generated during said step (a) to cause said antenna to be oriented for receiving said broadcast program data from at least one satellite;

(c) determining a first quality of at least one broadcast signal received by said antenna when said antenna is in a first orientation;

(d) automatically changing said first orientation of said antenna to a second orientation in a first direction;

(e) determining a second quality of at least one broadcast signal received by said antenna when said antenna is in said second orientation;

(f) electronically comparing said first and second qualities; and (g) automatically changing said second orientation of said antenna to a third orientation in said first direction based on whether said second quality was greater than or less than said first quality.

15. A method of receiving direct-to-home satellite broadcast program data by a receiver unit disposed at a position and being adapted to be connected to a home video display, said receiver unit having an antenna with an orientation, said method comprising the steps of:

(a) generating a geographic position signal corresponding to said position of said receiver unit based upon signals received from at least three satellites;

(b) automatically changing said orientation of said antenna to a subsequent orientation based upon said position signal generated during said step (a) to cause said antenna to be oriented for receiving said broadcast program data from at least one satellite;

(c) automatically orienting said antenna in a first direction based upon the relative qualities of at least one broadcast signal received by said antenna when said antenna is in a first orientation and a second orientation offset from said first orientation in a first direction; and (d) automatically orienting said antenna in a second direction based upon the relative qualities of the broadcast signals received by said antenna when said antenna is in a third orientation and a fourth orientation offset from said third orientation in a second direction, said first and second directions being non-parallel.

* * * * *